3,672,996
RECHARGEABLE ALKALINE GALVANIC CELL
AND ELECTROLYTE THEREFOR
Demetrios V. Louzos, Rocky River, Ohio, assignor to Union Carbide Corporation
Application June 20, 1968, Ser. No. 747,060, which is a Continuation-in-part of application Ser. No. 393,994, Sept. 2, 1964. Divided and this application Sept. 24, 1969, Ser. No. 863,747
Int. Cl. H01m 35/00
U.S. Cl. 136—6
14 Claims

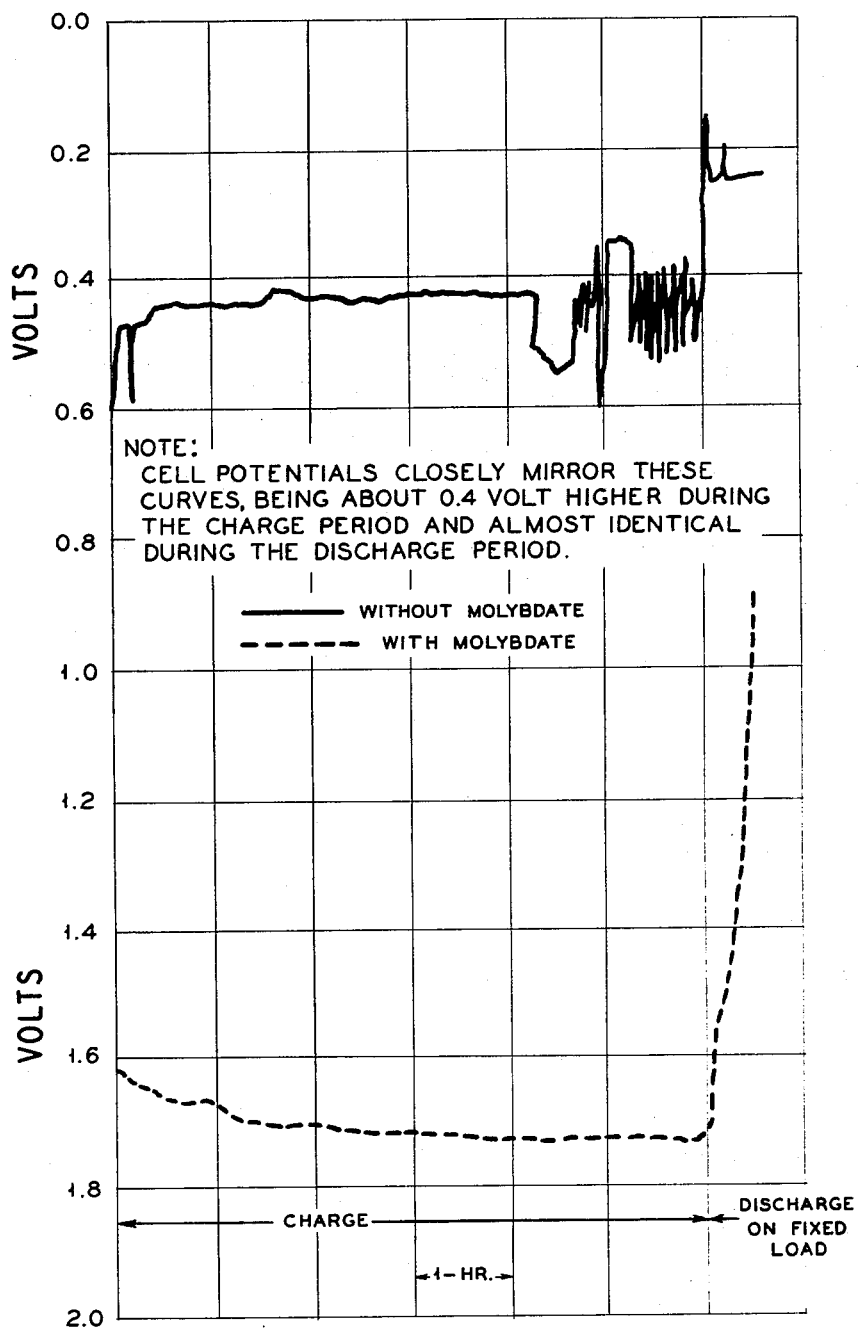
Charge at 10 Milliamps. per Square Inch of Apparent Electrode Cross Sectional Area at Constant Current United States Patent Office 3,672,996
Patented June 27, 1972

ABSTRACT OF THE DISCLOSURE

A rechargeable alkaline galvanic cell having a zincate-containing electrolyte which comprises an aqueous alkaline medium containing dissolved zincate ions in an amount such that the electrolyte contains at least about 2 weight percent zinc and an ion of an amphoteric metal, i.e., a molybdate, arsenate or tungstate.

This application is a division of my application Ser. No. 747,060, filed June 20, 1968, which is in turn a continuation-in-part of my earlier application Ser. No. 393,994, filed Sept. 2, 1964, both now abandoned.

This invention relates to rechargeable alkaline galvanic cells having improved alkaline zincate-containing electrolytes.

Zinc, when electrolytically plated out of a zincate solution at relatively high current densities and relatively low zincate ion concentrations, tends to deposit in the form of long dendritic crystals. This tendency is a considerable drawback to the use of zinc electrodes in rechargeable alkaline cells, because as a cell of this type is charged the dendritic crystals grow out and away from the electrodes which serves as a substrate. Ultimately these resulting crystals penetrate the separators interposed between the cathode and the anode materials of a cell and internally short-circuit the cell. The cycle life of the rechargeable cell is materially reduced thereby. Of course, the capacity of the cell is also reduced.

Efforts to alleviate the situations existing with rechargeable alkaline cells heretofore have centered primarily on the development of new separator materials and on the use of thicker or multi-layer separators. Unfortunately this approach limits the oxygen transfer within the cell for the purposes of its recombination during an overcharge of the cell containing the zinc electrode. This condition is particularly troublesome in conjunction with sealed rechargeable cells since high gas pressures can develop within the cell.

An alternate approach that has been explored is the reported suppression of zincate ions in the alkaline electrolytes commonly employed. This approach is illustrated by the silver oxide-zinc cells of Mandelsohn et al. U.S. Pat. 2,994,625 wherein the presence of zincate in the electrolyte is eliminated by substantially saturating the electrolyte with certain amphoteric ions, particularly with the aluminates.

It has been found, however, that the presence of a substantial amount of zincate ions in the electrolyte is effective in suppressing the growth of zinc dendrites upon electroplating. For example, it has been observed that when the concentration of zincate ions (expressed as weight percent of zinc) in an aqueous solution of potassium hydroxide (about 33 weight percent KOH) was increased from about 1.2 percent to about 3.6 percent, the incipient current density at which the growth of zinc dendrites occurred was increased from about 5 to about 35 amperes per square foot. Thus the electrolytes of the present invention contemplate the presence of a substantial amount of zincate ions therein.

It is the principal object of the present invention to provide a zincate-containing alkaline electrolyte from which a substantially level and adherent zinc deposit can be electroplated out.

It is a further object of the present invention to provide a zincate-containing alkaline electrolyte which decreases the tendency of a secondary or rechargeable cell employing a zinc electrode towards internal shortcircuiting.

It is another object to provide means for extending the cycle life of a rechargeable alkaline cell.

Still other objects will readily present themselves to the skilled artisan upon reference to the ensuing specification, the claims, and the drawing, in which the sole figure is a graph showing the performance of a typical rechargeable alkaline cell with and without an electrolyte of the present invention.

The foregoing objects are achieved by an electrolyte which is an aqueous alkaline medium containing zincate ions dissolved therein in an amount such that the solution contains at least about 2 weight percent zinc. An upper limit for the zincate ion concentration in the electrolyte is a solution saturated with respect to the zincate ion.

In a preferred embodiment of the present invention, the electrolyte contains, in addition to the aforementioned amounts of a zincate ion, also an ion of an amphoteric metal which can be a molybdate, an arsenate, or a tungstate. A molybdate ion is preferred.

The amphoteric metal ion should be present in the solution in an amount such that the solution contains at least about 280 parts per million of the corresponding amphoteric metal but does not exceed an amount which causes a mossy electrodeposit of zinc from the electrolyte. This upper limit on the amphoteric ion concentration in the electrolyte varies with the particular system involved but is readily ascertainable by routine experimentation.

When the amphoteric metal ion is a molybdate, the molybdenum concentration in the electrolyte preferably is from about $2.8 \times 10^2$ to about $2.8 \times 10^4$ parts per million. The lower concentration represents the minimum effective amount of molybdenum and the upper concentration represents an amount in excess of which an undesirable spongy or mossy electrodeposit of zinc is sometimes observed.

A molybdenum concentration of about $3 \times 10^3$ parts per million in an aqueous potassium hydroxide solution (about 35 weight percent KOH) which contains about 4.5 weight percent zinc oxide dissolved (i.e., having a zinc content of about 3.6 weight percent) therein was observed to give a very satisfactory electrodeposit of zinc over a very wide range of current densities (0 to 50 milliamperes per square centimeter). For this reason the above electrolyte formulation is considered a very useful one for alkaline cells. However, in order to take full advantage of the dendrite-suppressing action of both the zincate and molybdate additives, it is preferred to employ zinc concentrations in the electrolyte approaching saturation in conjunction with the higher concentration of molybdate.

At relatively high zinc concentrations in the electrolyte and relatively low current densities there exists a tendency toward the formation of loosely adherent, spongy zinc deposits on the electrode. Such deposits also have an adverse effect on the cycle life of a rechargeable cell. In order to guard against this situation it is sometimes desirable to add to the aforedescribed electrolyte an inorganic lead compound soluble therein. The lead compounds can be present in amounts such that the electrolyte contains, in addition to the molybdate, arsenate or tungstate, preferably from about 20 to about 400 parts per million of lead, existing in the solution as a plumbite.

The choice of the proper amphoteric metal ion is critical for the present invention. Amphoteric ions other than the foregoing were examined but were found to exert no beneficial effect when present in zincate-containing alkaline electrolytes. Specifically, vanadates, stannates, aluminates, tellurates, silicates, phosphates, columbates, carbonates, sulfates, chromates, and bismuthates were tried without success.

The aqueous alkaline media contemplated herein are the aqueous solutions of alkali hydroxides, that is, sodium hydroxide, potassium hydroxide, and lithium hydroxide. The choice of the particular hydroxide is governed by the type of service the cell will be subjected to, the desired conductivity of the electrolyte, and the economics of the intended application. For high-rate cells having universal application, potassium hydroxide is preferred.

Zinc can be introduced into the electrolyte in the desired amounts via any soluble zinc-bearing compound. Typical compounds are zinc oxide, potassium zincate, sodium zincate, and the like. Zinc oxide is the preferred compound for this purpose because of its good solubility characteristics and also because no superfluous foreign ions are introduced into the electrolyte upon dissolution. Zincate ions are formed in the alkaline medium as the zinc-bearing compounds dissolve therein. Zinc can also be introduced into the electrolyte by an anodic dissolution of zinc from an anode material of the cell.

Any soluble molybdate, tungstate, or arsenate can be employed in formulating the electrolyte. Very convenient for this purpose are the alkaline salts such as potassium orthoarsenate, potassium molybdate, potassium tungstate, sodium orthoarsenate, sodium molybdate, sodium tungstate, and the like.

It may even be desirable to employ a slightly soluble compound, e.g., calcium or strontium molybdate or other slightly soluble molybdate salt, which is capable of serving as a reserve supply of the desired additive in the cell. In some instances, it has been observed on repeated cycling of sealed nickel oxide-zinc batteries that molybdate eventually becomes depleted from the electrolyte to a level below its most effective concentration range. This situation can be avoided by employing a molybdate whose solubility is such that an effective amount is present in the solution at all times. As the additive is partially removed on cycling, more of it goes into solution from a readily available reserve.

The plumbite ions can be introduced into the electrolyte in any convenient manner. Usually an inorganic lead compound is dissolved in the alkaline zincate electrolyte to produce the requisite amount of plumbite. Typical of such compounds are lead hydroxide, potassium plumbite, lead monoxide, and the like. Particularly preferred is lead monoxide since in this manner lead is introduced into the electrode in a soluble form but without the introduction of any foreign ions that may deleteriously affect the performance of the electrolyte. In some instances sufficient lead can be introduced into the electrolyte by means of the zinc electrode itself. Battery grade zinc uusually contains some lead, and this amount can be augmented in any convenient manner, such as for example, electrodeposition or immersion plating, during the fabrication of the electrode. Also special lead-zinc alloys may be fabricated and used for this purpose.

This invention is further illustrated by the following examples:

EXAMPLE 1

A number of cells were constructed each having a nickel oxide cathode and a high surface area anode, both contained in a metal can. A cadmium reference electrode was also placed in the cell in order to measure the separate cell electrode potentials.

The electrolyte was an aqueous potassium hydroxide solution (about 45 weight percent KOH) containing about 15 weight percent ZnO dissolved therein (Zn concentration in the electrolyte was about 12 weight percent). The electrolyte was incorporated in the cell by absorbing it in a cell separator made from a synthetic fiber batt and situated between the cell cathode and the cell anode. Some of the electrolyte was also absorbed in the high surface area zinc anode.

A control cell was produced containing no electrolyte additives other than zinc as the zincate ion in the aforementioned amount. All other cells contained about 1000 p.p.m. molybdenum as molybdate ions, introduced by dissolving $MoO_3$ in the aqueous potassium hydroxide solution.

All cells were discharged across a 20-ohm load and subsequently recharged at a rate of about 10 ma./sq. in. of apparent electrode surface area for a number of cycles. The recharging was carried out at a constant current.

The potential existing between the nickel oxide electrode and the cadmium reference electrode during the fourteenth charge and discharge cycles is shown in FIG. 1. The cell voltages closely mirrored the electrode potentials shown in FIG. 1 except that the cell voltage was about 0.4 volt higher during the charge period. The cell voltage was substantially identical to the electrode potentials observed during the discharge period.

The control cell, containing no molybdate, did not accept a charge during the fourteenth cycle and thus produced no useful discharge.

The sharp fluctuations of the electrode potential shown in FIG. 1 can be attributed to the formation and erratic dissolution of zinc dendrites. Similar fluctuations were observed also on the earlier charge cycles of the control cell. A post mortem visual examination of the control cell revealed that a family of zinc dendrites had formed and bridged across the separator to internally short the cell. These internal shorts are believed to be the cause for the control cell's inability to accept a charge as indicated by its very low electrode potential on charging.

In contrast to the control cell, the cells containing the molybdate additive succesfully accepted a charge as indicated in FIG. 1. After the experiment these cells were also opened and a visual examination revealed a substantially decreased dendrite growth.

EXAMPLE 2

The minimum and maximum suitable concentrations of molybdenum in the electrolyte were determined in the following manner.

An electrolyte was prepared by dissolving about 4.5 weight percent zinc oxide (about 3.6 weight percent Zn) in an aqueous solution of potassium hydroxide (about 36 weight percent KOH). To aliquots of this solution, predetermined measured amounts of molybdenum trioxide were added and dissolved. The resulting solutions were electrolyzed in Hull cells for a period of about 30 minutes at a current of about 1 ampere. The electrolysis was performed at room temperature and using a zinc anode and a copper cathode.

Examination of the resulting zinc electrodeposits revealed that the minimum effective concentration of molybdenum in the electrolyte is about $2.8 \times 10^2$ parts per million and the maximum preferred concentration is about $2.8 \times 10^4$ parts per million. Optimum electrodeposition was obtained at a molybdenum concentration of about $3 \times 10^3$ parts per million.

EXAMPLE 3

An electrolyte was prepared by dissolving zinc oxide (15 weight percent) in an aqueous solution of potassium hydroxide (about 45 weight percent KOH). In this solution molybdenum trioxide was dissolved in an amount sufficient to give a molybdenum concentration of about $1.23 \times 10^4$ parts per million of the final solution.

The electrolyte was then introduced into nickel-oxide-zinc cells having the anode and the cathode separated by six layers of a synthetic fiber batt. The cells were then sealed and subjected to discharge-charge cycles. Another series of cells were prepared identical except that no molybdate was present in the electrolyte.

The cells were discharged to a voltage cut-off of about 0.9 volt (approximately at the 10 hour rate) and then charged at a constant current to a fixed upper voltage limit of 1.83 volts. This procedure resulted in an overcharge of from about 20 to about 100 percent.

Under the above conditions which involved considerable overcharge of the cells on each cycle of the cells the electrolyte of which contained molybdate had a useful life of about 20 cycles. Those cells the electrolyte of which contained no molybdate had a useful life of from 1 to 4 cycles.

EXAMPLE 4

An electrolyte was prepared by dissolving zinc oxide (about 4 weight percent) in an aqueous solution of potassium hydroxide (about 33.3 weight percent KOH). The resulting alkaline zincate solution was then divided into several aliquots to some of which was added a molybdate, a plumbite, or both a molybdate and a plumbite. These aliquots were then electrolyzed in Hull cells in the manner described in Example 2. The experimental results are compiled below in Table I.

TABLE I

| Type and concentration of additives, (p.p.m.[1]) | Current density in milliamperes per square centimeter | | |
|---|---|---|---|
| | Dendritic crystal growth away from substrate | Satisfactorily level adherent deposit | Loosely adherent spongy deposit |
| None | >47 | 47-20 | <20 |
| Pb (20) | >39 | 39-0 | None |
| Mo (1,200) | ([2]) | 50-23 | <23 |
| Pb (20) and Mo (1,200) | ([2]) | 50-0 | None |
| As (1,800) | >49 | 49-0 | None |
| W (1,800) | >49 | 49-0 | [3]None |

[1] Concentration expressed as parts per million of the element based on the weight of the electrolyte.
[2] At edge only.
[3] Except at the very edge.

Data shown in the foregoing table amply show that additional benefits are gained, particularly at the relatively lower current densities, when both lead-bearing and molybdenum bearing additives are present in the electrolyte.

EXAMPLE 5

To two portions of the alkaline zincate electrolyte described in Example 4 were added potassium tungstate ($K_2WO_4$) and zinc arsenate ($Zn_3[AsO_4]_2$), respectively. The concentration of these additives was such that the amphoteric element (W, As) was present in 1800 p.p.m. based on the weight of the electrolyte. These electrolytes were then electrolyzed in Hull cells in the manner described in Example 2. The data shown in Table I demonstrate the activity of these two additives in suppressing both dendrite and moss formation.

EXAMPLE 6

The following experiments were performed to evaluate the effects on zinc dendrite formation of prior art aluminate additives in a zincate-containing alkaline electrolyte. A stock electrolyte was made up of 35% (by weight) KOH containing 4.1% ZnO (about 3.3 percent by weight Zn). To three portions of this electrolyte were added varying amounts of sodium aluminate as follows:

| Solution, grams | Additive | Concentration of metallic Al |
|---|---|---|
| A, 435 | 77 grams $NaAlO_2$ | 6.4% by weight. |
| B, 435 | 13.5 grams $NaAlO_2$ | 1.0% by weight. |
| C, 437.5 | 1.21 grams $NaAlO_2$ | $2.8 \times 10^3$ p.p.m. |

The above solutions and a control solution (without aluminate) were electrolyzed in Hull cells at room temperature for one-half hour at a current of about 1 ampere. A zinc anode and copper cathode were employed. The effects observed on the character of the plated zinc deposits are summarized in Table II below. As these data show, concentrations of aluminum of 1.0% and 6.4 wt.-percent substantially increased the range of dendrite growth, particularly at the highest concentration i.e., 6.4 wt.-percent. A further observation was that the cell potential was much greater in the cell containing Solution A (of the order of 0.3 volt higher than the control), thus indicating a substantial decrease in electrolyte conductivity at the high aluminate concentrations. Such a condition is most undesirable in commercial cells.

The current density level at which dendrites were formed in Solution C was essentially the same as with the control solution. The concentration of aluminate in Solution C was selected to fall in the range disclosed herein for molybdates, etc. By comparing the results obtained with Solution C containing $2.8 \times 10^3$ p.p.m. Al with those for the molybdate additive, the superior performance of the additives of this invention in suppressing dendrite formation in a zincate-containing electrolyte is clearly shown.

TABLE II

| Concentration of aluminum additives | Current density in milliamperes per square centimeter | | |
|---|---|---|---|
| | Dendritic crystal growth away from substrate | Satisfactory level adherent deposit | Loosely adherent spongy deposit |
| None | >43 | 43-15 | <15 |
| 6.4% by weight [1] | >20 | 20-7 | <7 |
| 1.0% by weight [1] | >38 | 38-18 | <18 |
| $2.8 \times 10^3$ p.p.m.[1] | >43 | 43-18 | <18 |

[1] Put into solution as $NaAlO_2$.

The electrolyte of the present invention can be employed in any rechargeable cell which utilizes zinc as the negative active material. Typical positive active materials for such cells are nickel oxide, AgO, $Ag_2O$, $MnO_2$, HgO, $PbO_2$, $O_2$, and the like.

The foregoing discussion and examples are intended as illustrative. Other modifications and variations can be resorted to without a departure from the spirit and scope of this invention.

What is claimed is:

1. In a rechargeable alkaline galvanic cell including a zinc anode, a cathode and an electrolyte, the improvement in combination therewith for reducing the growth of dendritic crystals from the surfaces of the anode while the cell is being charged, said improvement comprising an electrolyte composed of an aqueous alkaline medium consisting essentially of zincate ions in an amount such that the electrolyte contains at least about 2 weight percent zinc, an ion of an amphoteric metal which is a member of the group consisting of a molybdate, arsenate and tungstate, in an amount such that the electrolyte contains at least about 280 parts per million of the corresponding amphoteric metal and a soluble inorganic lead compound in an amount such that the electrolyte contains from about 20 to about 400 parts per million of lead.

2. The rechargeable alkaline galvanic cell of claim 1 wherein the electrolyte comprises an aqueous alkaline medium consisting essentially of zincate ions in an amount such that the electrolyte contains at least about 2 weight percent zinc, and molybdate ions in an amount such that the electrolyte contains from about $2.8 \times 10^2$ to about $2.8 \times 10^4$ parts per million of molybdenum.

3. The rechargeable alkaline galvanic cell of claim 1 wherein the electrolyte comprises an aqueous alkaline medium consisting essentially of zincate ions saturated therein and containing molybdate ions in an amount such that the electrolyte contains from about $2.8 \times 10^2$ to about $2.8 \times 10^4$ parts per million of molybdenum.

4. The rechargeable alkaline galvanic cell of claim 1 wherein the electrolyte comprises an aqueous alkaline medium containing zincate ions in an amount such that the electrolyte contains at least about 2 weight percent zinc as zincate ions; molybdate ions in an amount such that the electrolyte contains at least about 280 parts per million of molybdenum but less than an amount causing a mossy electrodeposit of zinc from the electrolyte; and a soluble inorganic lead compound in an amount such that the electrolyte contains from about 20 to about 400 parts per million of lead.

5. The rechargeable alkaline galvanic cell of claim 1 wherein the electrolyte comprises an aqueous alkaline medium saturated with zincate ions and containing molybdate ions in an amount such that molybdenum is present in an amount from about $2.8 \times 10^2$ to about $2.8 \times 10^4$ parts per million, and a soluble inorganic lead compound in an amount such that the electrolyte contains from about 20 to about 400 parts per million of lead.

6. The rechargeable alkaline galvanic cell of claim 1 wherein the electrolyte comprises an aqueous potassium hydroxide solution consisting essentially of at least about 2.5 percent by weight zinc oxide dissolved therein together with a molybdate in an amount such that the resulting solution contains from about $2.8 \times 10^2$ to about $2.8 \times 10^4$ parts per million of molybdenum.

7. The rechargeable alkaline galvanic cell of claim 1 wherein the electrolyte comprises about 36 percent by weight aqueous potassium hydroxide solution having dissolved therein about 4.5 weight percent zinc oxide and molybdenum trioxide in an amount such that the resulting solution contains about $3 \times 10^3$ parts per million of molybdenum.

8. The rechargeable alkaline galvanic cell of claim 1 wherein the electrolyte comprises about 45 weight percent aqueous potassium hydroxide solution; about 15 weight percent zinc oxide dissolved therein; and molybdenum trioxide dissolved therein in an amount sufficient to provide about $1.23 \times 10^4$ parts per million of molybdenum in the resulting solution.

9. The rechargeable alkaline galvanic cell of claim 1 wherein the electrolyte comprises an aqueous alkaline medium containing zincate ions in an amount such that the electrolyte contains at least about 2 weight percent zinc as zincate ions; about 1800 parts per million of tungsten present as tungstate ions; and a soluble inorganic lead compound in an amount such that the electrolyte contains from about 20 to about 400 parts per million of lead.

10. The rechargeable alkaline galvanic cell of claim 1 wherein the electrolyte comprises about 33.3 weight percent aqueous potassium hydroxide solution having dissolved therein about 4 weight percent zinc oxide and potassium tungstate in an amount such that the resulting solution contains about 1800 parts per million of tungsten.

11. The rechargeable alkaline galvanic cell of claim 1 wherein the electrolyte comprises an aqueous alkaline medium containing zincate ions in an amount such that the electrolyte contains at least about 2 weight percent zinc as zincate ions; about 1800 parts per million of arsenic present as arsenate ions; and a soluble inorganic lead compound in an amount such that the electrolyte contains from about 20 to about 400 parts per million of lead.

12. The rechargeable alkaline galvanic cell of claim 1 wherein the electrolyte comprises about 33.3 weight percent aqueous potassium hydroxide solution having dissolved therein about 4 weight percent zinc oxide, and zinc arsenate in an amount such that the resulting solution contains about 1800 parts per million of arsenic.

13. The rechargeable alkaline galvanic cell of claim 1 wherein the cathode contains an electrochemically active material selected from the group consisting of nickel oxide, silver oxide, manganese dioxide, mercuric oxide and lead oxide.

14. The rechargeable alkaline galvanic cell of claim 1 wherein the cathode is an oxygen-depolarizable electrode.

References Cited

UNITED STATES PATENTS

| | | | |
|---|---|---|---|
| 1,416,738 | 5/1922 | Muren | 136—154 |
| 2,080,520 | 5/1937 | Westbrook | 204—55 Y |
| 2,218,734 | 10/1940 | Westbrook | 204—55 Y |
| 2,422,045 | 6/1947 | Ruben | 136—107 |
| 2,714,624 | 8/1955 | Costa et al. | 136—154 |
| 2,775,534 | 12/1956 | Herbert | 136—139 |
| 2,905,739 | 9/1959 | Strauss | 136—6 |
| 2,994,625 | 8/1961 | Mendelsohn et al. | 136—154 |
| 3,114,659 | 12/1963 | Warren | 136—178 |
| 3,236,690 | 2/1966 | Booe et al. | 136—30 |
| 3,317,412 | 5/1967 | Dahlmann | 204—55 |

FOREIGN PATENTS

| | | | |
|---|---|---|---|
| 1,150,255 | 6/1963 | Germany | 204—55 |

OTHER REFERENCES

Frederick A. Lowenheim, Modern Electroplating, pp. 30 and 31, second edition (1963).

WINSTON A. DOUGLAS, Primary Examiner

A. SKAPARS, Assistant Examiner

U.S. Cl. X.R.

136—30, 154